United States Patent

Vallieres

[15] 3,648,532
[45] Mar. 14, 1972

[54] DRIVE SYSTEM

[72] Inventor: Ulric Vallieres, Therese, Quebec, Canada

[73] Assignee: St. Lawrence Manufacturing Company, Inc., Giffard, Quebec, Canada

[22] Filed: Apr. 29, 1969

[21] Appl. No.: 820,272

[52] U.S. Cl. ........................................................74/230.17
[51] Int. Cl. ....................................................F16h 55/52
[58] Field of Search ...........................................74/230.17

[56] References Cited

UNITED STATES PATENTS

| | | | |
|---|---|---|---|
| 3,174,348 | 3/1965 | Luenberger | 74/230.17 C |
| 3,250,553 | 5/1966 | Detwiler | 74/230.17 C |
| 3,383,934 | 5/1968 | Flynn | 74/230.17 C |
| 2,651,210 | 9/1953 | Clark | 74/230.17 |
| 3,066,546 | 12/1962 | Thostenson | 74/230.17 |
| 3,393,572 | 7/1968 | Larsson | 74/230.17 |

FOREIGN PATENTS OR APPLICATIONS

| | | | |
|---|---|---|---|
| 435,527 | 9/1935 | Great Britain | 74/230.17 |
| 724,395 | 12/1965 | Canada | 74/230.17 |

*Primary Examiner*—C. J. Husar
*Attorney*—Wolf, Greenfield & Sacks

[57] ABSTRACT

A drive pulley assembly having facing sheaves that move together to engage and drive a pulley belt when rotated at higher speeds. Movement of the sheaves towards one another is effected by a plurality of counter weights that pivot under the influence of centrifugal force as the speed of rotation increases to exert an axial force on one of the sheaves to move it toward the other. A spring return is utilized.

7 Claims, 3 Drawing Figures

Patented March 14, 1972 3,648,532

INVENTOR
Ulric Vallieres
BY
Wolf, Greenfield Hieken Sacks

DRIVE SYSTEM

SUBJECT MATTER OF INVENTION

The present invention relates to a torque converter in the form of a drive pulley having sheaves adapted to be moved toward and away from one another in functional relation with respect to variances in the speed of rotation of the pulley.

BACKGROUND OF INVENTION

There have been many attempts to provide better drive pulleys, particularly designed to function as a torque converter between a power source and a drive mechanism. Such pulleys, for example, are commonly used in skimobiles for transmitting power from the motor shaft to a clutch, which in turn is operatively connected to the sprockets that interengage the treads of the skimobile. In such arrangements, the power source is frequently a motor with no more than a few cylinders which may generate a great deal of vibration in the machine. Because of this and other problems, a drive pulley having a movable sheave or cone is ordinarily used for transmitting power to the pulley belt from the motor shaft. In such pulley arrangements, the sheaves move together to assure a tight interengagement and drive without slipping between the pulley belt and the pulley sheaves. When the sheaves move together, the loop portion of the belt is moved radially outwardly from the axis of the sheaves thereby increasing tension on the belt. Such arrangements, however, introduce other problems which heretofore have been significant and substantial in the construction of a satisfactory adjustable drive pulley. For one thing, there has been great a great deal of difficulty in wear and breakage of components, especially in the means for supporting the movable sheaves in the drive pulley assembly. In addition, because of the significant vibrations to which the drive pulley may be subjected, the various components and especially the housing have a tendency to loosen and fall off. On other occasions, loosening of the various components cause binding and damage to the component parts. In addition, significant vibrations often encountered in apparatus of this nature also results in the generation of unreasonable noises that arise as a result of the banging of loose parts together.

SUMMARY OF INVENTION

It is therefore an object of the present invention to provide an adjustable drive pulley assembly in which the foregoing disadvantages of existing mechanisms are overcome. It is an object of the present invention to provide an adjustable drive assembly having an adjustable sheave that is supported by more rugged means than heretofore provided. A further object of this invention is to provide means for positive drive of a movable sheave to avoid slipping relative to the belt. Another object of the present invention is to provide improved means for limiting noise that arises in the drive pulley assembly from slapping of components against one another. A still further object of the present invention is to provide an improved torque converter means and speed control means. A further object of the present invention is to provide an improved drive pulley assembly which is not likely to bind, wobble, become loose, or create unreasonable amounts of noise.

In the present invention, there is provided a drive pulley assembly for transmitting a drive force generated by a motor shaft to a pulley belt which is interengaged with a driven mechanism, as for example the driven mechanisms of a snowmobile. A pair of aligned sheaves having frusto-conic surfaces engage a pulley belt and are in turn driven by a pulley shaft that extends through the sheaves. One of the sheaves is supported for movement to and away from the other sheaves. Means are provided for exerting axial force on the sheaves to move them towards one another as speeds are increased. Such means include a counter weight that is adapted to exert an axial force on the other of the frusto-conic sheaves when the speed of rotation of the drive pulley is increased. The sleeve which supports a movable frusto-conic sheave is reinforced by an annular frusto-conic web that interconnects the movable sheave and the sleeve in which it is mounted. This means for supporting the movable sheave is provided with apertures adapted to align with counter weights that exert the axial force on the movable sheave. Means are also provided to deaden sound which results from movement of the counter weight means.

BRIEF DESCRIPTION OF DRAWINGS

The foregoing objects and advantages of the present invention will be more clearly understood when considered in conjunction with the accompanying drawings in which.

DETAILED DESCRIPTION OF PREFERRED EMBODIMENT

The specific embodiment of the invention illustrated is designed for use with snowmobile and is intended to function as a means for transmitting power from a motor shaft to the clutch associated with the drive sprockets.

The drive pulley is suitably supported in alignment with the drive shaft of the motor with a pulley belt adapted to be connected to a clutch unit.

Figure 2:
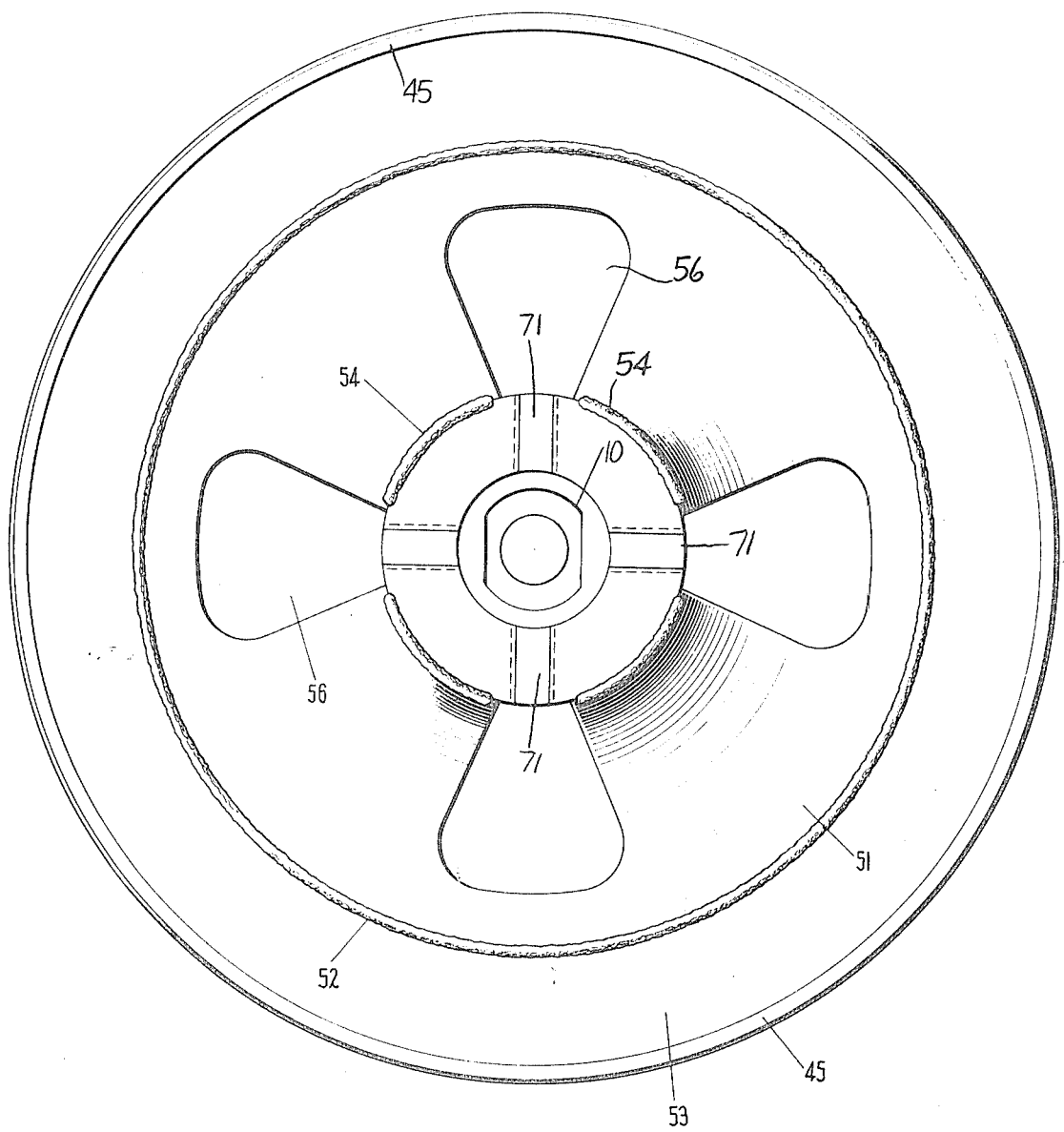
FIG. 2 is a cross-sectional view substantially taken along the line 2—2 of FIG. 1.
Figure 3:
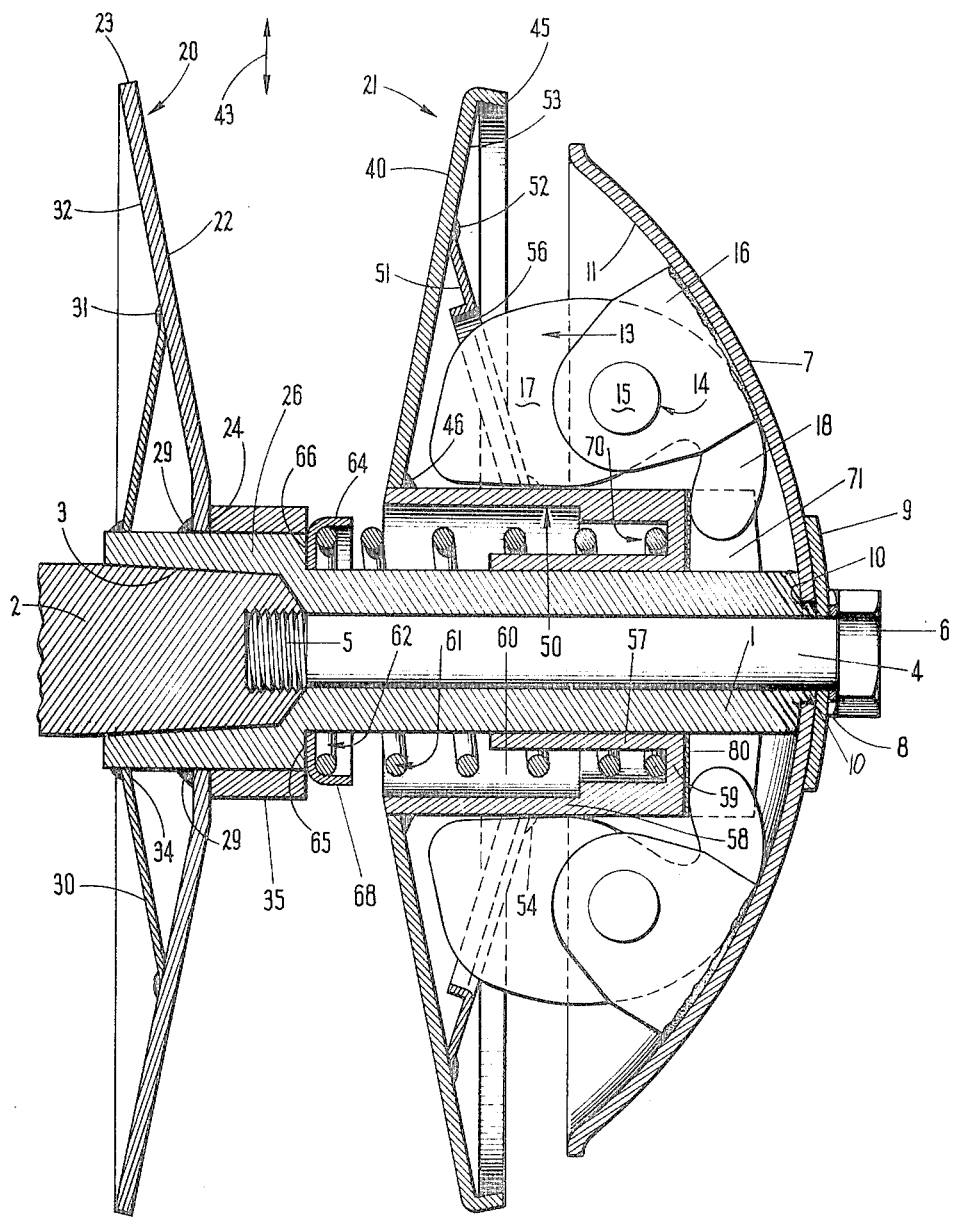
FIG. 3 is a cross-sectional view taken along the line 3—3 of FIG. 1.

The motor shaft 2 of the machine is secured in axial alignment with a pulley shaft 1. The motor shaft 2 is tapered at one end 3 to fit within a socket of the pulley shaft. The pulley shaft is locked to the motor shaft by a bolt 4 which extends lengthwise from the other end of the pulley shaft into a tapped hole in the end 3 of the motor shaft. The bolt 4 is threaded at its end 5 for threading engagement with the motor shaft. The head 6 of the bolt 4 engages and also locks the pulley shaft 1 and a bell-shaped housing 7 together. Such a locking means may be provided by forming the aperture in the housing 7 through which bolt 4 extends with an irregular shape having for example flat sides and round ends, as illustrated in FIG. 2. A complementary boss 10 on shaft 1 engages this aperture to lock the housing and shaft together. A lock washer 8 and a concave washer 9 are interposed between the head 6 of the bolt 4 and the outer surface of the housing 7 with the inner surface of the housing 7 engaging the boss 10 at one end of the pulley shaft 1. The housing 7 has a concave inner surface 11 with the outer periphery of the housing preferably slightly flared to form a peripheral lip 12.

A plurality of counter weight means 13 are pivotally secured to the inner surface of the housing 7 by suitable means 14. In the specific embodiment illustrated, four counter weights are radially arranged about the axis of the housing at 90° with respect to one another. These counter weight means 13 are each pivotally supported by a pin 15 in turn locked at its ends to a pair of spaced-parallel tab supports 16 which project from the inner surface 11 of the housing 7. The pin 15 is spaced a distance from the inner surface 11 of the housing to permit pivoting movement of the counter weight means 13. The counter weight means 13 comprises a heavy metallic weight having an enlarged mass 17 extending radially from the pin 15 in a direction away from the housing 7 and a lever 18 extending inwardly from the pin 15 toward the axis of the housing between the pin 15 and the housing 7. These levers 18 are designed to exert axial force on means hereafter described when the speed of rotation of the pulley increases.

A pair of sheaves 20 and 21 are supported on the pulley shaft 1. Sheave 20 is substantially frusto-conic in cross-sectional configuration with the inner surface 22 flared outwardly to the periphery 23. The center of the sheave 20 is provided with a flat or planar surface 24 having an aperture through which an enlarged end or collar 26 of the pulley shaft extends. The inner periphery of sheave 20 butts against the outer wall of the pulley shaft at end 26 and may be suitably secured to it by a bead of welding 29. A reinforcing web 30 interengages the sheave 20 and the outer surface of the pulley shaft 1 at end 26. This web 30 is preferably frusto-conic. The outer periphery of the web 30 is bead welded at 31 to the outer surface 32 of the sheave 20, preferably about midway between the inner and outer peripheries of the sheave 20. The other edge 34 of the web 30 is welded to the outer surface of the pulley shaft 1 at end 26 at a distance spaced from the weld 29.

Interposed between the two sheaves 20 and 21 is a bearing ring 35 which may be of brass and which is coaxial with the pulley shaft 1. The inner surface of the ring 35 rotatably bears against the outer surface of the enlarged end 26 of the pulley shaft.

The other sheave 21 has an inner surface 40 which faces the inner surface 22 of sheave 20. These surfaces 22 and 40 form a V-shaped angle designed to receive and engage the side walls of a V-shape cross section pulley belt with the pulley belt adapted to move radially inwardly or outwardly in the direction of arrows 43 depending upon the spacing of the surfaces 22 and 40. Sheave 21 has an outer periphery on which is formed a lip 45 that is directed toward the housing. The inner periphery of the sheave 21 is butt welded by annular weld 46 to one end of the sleeve means 50. A web 51, which is frusto-conic in configuration, has an outer periphery which is welded by annular weld 52 to the outer surface 53 of the sheave 21, preferably at a distance halfway between the inner and outer peripheries of the sheave 21. The inner periphery of the web 51 is spot welded by welds 54 (FIG. 2) to the outer surface of sleeve means 50 at a distance spaced from welds 46. The web 51 is formed with a plurality of apertures 56 that are aligned with the counter weight means 13 extending partially through the apertures 56 when not under the influence of centrifugal force. The apertures are enlarged closer to the outer periphery, as illustrated in FIG. 2.

Figure 1:
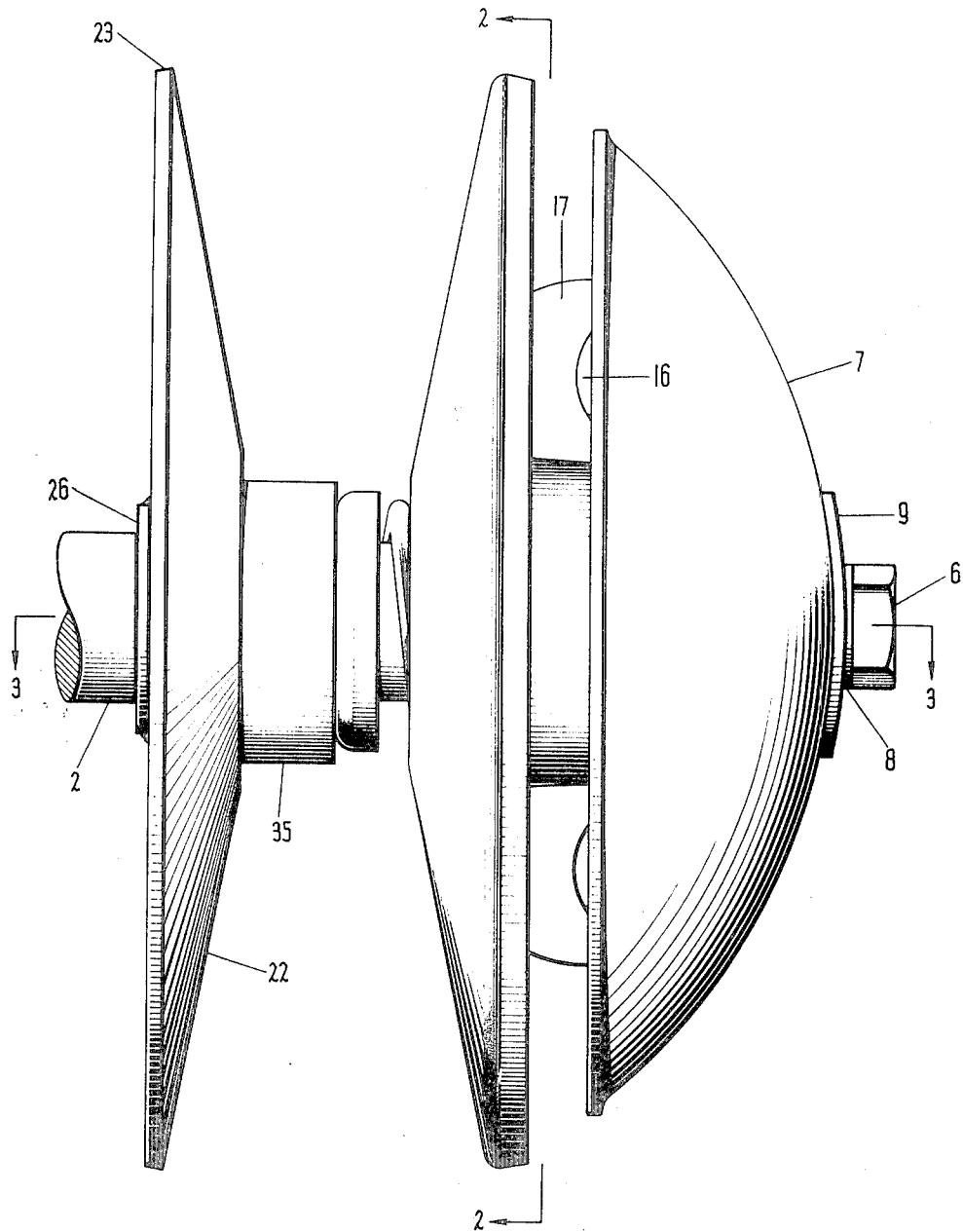
FIG. 1 is a side elevational view of a drive pulley assembly embodying the present invention with the particular drive pulley assembly illustrated designed especially for use in connection with the operation of snowmobiles, and with the components illustrated attached to the motor shaft of the snowmobile and adapted to interengage a pulley belt in turn engaging a pulley of a clutch mechanism.

The sleeve means 50 comprises an inner wall 57 and an outer wall 58 interconnected by a bight 59 at the end of the sleeve means 50 opposite to that end to which the sheave 21 is secured. The inner and outer walls 57 and 58 define an annular recess 60 within which a helical spring 61 is positioned coaxial with the pulley shaft 1. One end 62 of the spring 61 bears against an annular cap 64 which is slidably and coaxially mounted on pulley shaft 1. The cap 64 has an angular cross section with one leg 65 adapted to simultaneously engage shoulder 66 on the outer surface of shaft 1 and the sleeve 35, thus securing the sleeve in the position illustrated in FIG. 1. A second leg 68 is flared over the adjacent end 62 of the spring 61. The other end 70 of the spring 61 fits within a narrowed annular segment of the opening 60 and bears against the inner surface of bight 59. The spring 61 normally tensions the cap 62 against the shoulder 66 and bearings 35 and normally exerts a force on the sleeve 50 and attached sheave 21 in a direction away from sheave 20 and toward the housing 7. The movement of sleeve means 50 and attached sheave 21 in a direction toward the housing is limited by the interengagement of the lever 18 with the end of the sleeve. The levers 18 project inwardly into slots radially formed in the end of the sleeve means 50 in alignment with the flat counter weight means 13 and function to interlock housing 7 and sleeve means 50.

A liner 80 of plastic material, such for example as nylon, is positioned at the end of the pulley shaft 1 in which the slots 71 are formed. This liner 80 has an annular configuration and is formed with a thin wall of plastic material that conforms and lines the side walls and bottom of each of the slots 71. This annular liner 80 thus provides a series means adapted to isolate the side walls of the lever 18 as well as its edge from engagement with either the bottom or side walls of the slots 71 formed in the sleeve 50. This liner functions to deaden noises which otherwise become significant especially at idling speeds.

In the operation of this drive pulley assembly, the pulley belt positioned between the sheaves 20 and 21 is normally close to the inner periphery of the sheaves and is adjacent to the bearing ring 35 at idle or low speeds. As the speed of the motor increases, the sheaves 20 and 21 rotate at higher speeds. Simultaneously, the centrifugal force generated by this increased rotation causes the counter weights 13 to pivot about their pins 15 with the mass portion 17 moving radially outwardly with respect to the pulley shaft 1 and the lever 18 moving radially inwardly about pins 15. The movement of levers 18, which engage the bottoms of the slots 71 cause the sleeve 50 to move axially toward sheave 20 against the tension of spring 61. This in turn forces the pulley belt outwardly towards the outer peripheries 23 and 45 of the sheaves, thereby increasing the tension on the pulley belts. The other end of the pulley belt circumscribes a driven means which may be provided with a complimentary arrangement. In such an arrangement, a pair of sheaves are movable toward and away from one another and are normally tensioned by spring means toward one another so that adjustable forces are exerted on the pulley belt. In a low speed position, the belt would be arranged in such a manner that the belt was spaced from the axis of the driven means pulley. Upon increased speeds of the motor, the pulley belt about the driven means pulley would move towards the axis of the pulley against the tension of the spring means described.

What is claimed is:

1. A drive pulley assembly for transmitting a drive force generated by a motor shaft to a pulley belt which is interengaged with a driven means comprising, a pair of aligned sheaves having frusto-conic surfaces adapted to drivingly engage opposite sides of said pulley belt, a pulley shaft axial with and extending through said sheaves, means for securing in axial alignment said pulley shaft to said motor shaft, means for locking one of said sheaves to said pulley shaft, sleeve means for securing the other of said sheaves to said pulley shaft against relative rotational movement but with limited axial movement relative to said pulley shaft, a housing secured to said pulley shaft, counter weight means, means pivotally supporting said counter weight means on said housing intermediate said housing and said other of said sheaves, said counter weight means including portions for pivoting to and from operational engagement with said sleeve means for securing the other of said sheaves and for exerting an axial force on said other of said sheaves whereby said sheaves will move closer together and said pulley belt will thereby be moved radially outwardly with respect to said axis of said pulley shaft, and spring means for moving said other of said sheaves away from said one of said sheaves in the absence of said axial force, wherein said sleeve means for securing the other of said sheaves to said pulley shaft includes a sleeve coaxial with said pulley shaft and having an inner cylindrical surface bearing on said pulley shaft, and a web having one edge secured to the surface opposite said facing surface of the other of said sheaves and a second edge secured to the outer surface of said sleeve, said web and other of said sheaves having a cross section with an acute angle therebetween, said web having at least one aperture formed therein through which said counter weight means may pivot, said one edge of said web being connected to said other of said sheaves at a point closer to the outer periphery of the other of said sheaves than to the centerline of said sleeve.

2. An assembly as set forth in claim 1 having means forming a plurality of apertures in said web aligned with said counter weight means whereby said counter weight may pivot at least partially through said web.

3. An assembly as set forth in claim 2 wherein said apertures are defined by edges that are flared to form a lip about said aperture.

4. An assembly as set forth in claim 1 having a plastic cap covering one end of said sleeve intermediate said sleeve and said counter weight means.

5. An assembly as set forth in claim 4 wherein said counter weight means includes a plurality of counter weights each having a mass and a lever, said sleeve having one end formed with a plurality of radially extending slots, each aligned with one of said levers, with said levers adapted to engage said sleeve through said slots, and a plastic liner positioned in said slots intermediate said sleeve and said levers.

6. An assembly as set forth in claim 1 wherein said means for securing said pulley shaft to said motor shaft includes a bolt extending axially through said pulley shaft and threaded into said motor shaft.

7. A drive pulley assembly for transmitting a drive force generated by a motor shaft to a pulley belt which is interengaged with a driven means comprising, a pair of aligned sheaves having frusto-conic surfaces adapted to drivingly engage opposite sides of said pulley belt, a pulley shaft axial with and extending through said sheaves, means for securing in axial alignment said pulley shaft to said motor shaft, means for locking one of said sheaves to said pulley shaft, sleeve means for securing the other of said sheaves to said pulley shaft against relative rotational movement but with limited axial movement relative to said pulley shaft, biasing means intercoupling said housing in said other of said sheaves, said biasing means including portions operatively engaging said sleeve means for securing the other of said sheaves and for exerting an axial force on said other of said sheaves whereby said sheaves will move closer together and said pulley belt will thereby be moved radially outwardly with respect to said axis of said pulley shaft, and spring means for moving said other of said sheaves away from said one of said sheaves in the absence of said axial force, wherein said sleeve means for securing the other of said sheaves to said pulley shaft includes a sleeve coaxial with said pulley shaft and having an inner cylindrical surface bearing on said pulley shaft, and a web having one edge secured to the surface opposite said facing surface of the other of said sheaves and a second edge secured to the outer surface of said sleeve, said web and other of said sheaves having a cross section with an acute angle therebetween, said web having at least one aperture formed therein through which said biasing means may pass, said acute angle being on the order of 20°–60°.

* * * * *